US 11,391,265 B2

(12) United States Patent
Barre et al.

(10) Patent No.: US 11,391,265 B2
(45) Date of Patent: Jul. 19, 2022

(54) COLLAPSIBLE VERTICAL-AXIS WIND TURBINE

(71) Applicants: CENTRE NATIONAL DE LA RECHERCHE SCIENTIFIQUE, Paris (FR); INSTITUT POLYTECHNIQUE DE GRENOBLE, Grenoble (FR)

(72) Inventors: Stéphane Barre, Gap (FR); Jean-luc Achard, Grenoble (FR); Guillaume Balarac, Vaulnaveys-le-bas (FR); Guillaume Maurice, Grenoble (FR)

(73) Assignees: CENTRE NATIONAL DE LA RECHERCHE SCIENTIFIQUE, Paris (FR); INSTITUT POLYTECHNIQUE DE GRENOBLE, Grenoble (FR)

(*) Notice: Subject to any disclaimer, the term of this patent is extended or adjusted under 35 U.S.C. 154(b) by 0 days.

(21) Appl. No.: 17/052,105

(22) PCT Filed: May 14, 2019

(86) PCT No.: PCT/EP2019/062372
§ 371 (c)(1),
(2) Date: Oct. 30, 2020

(87) PCT Pub. No.: WO2019/219702
PCT Pub. Date: Nov. 21, 2019

(65) Prior Publication Data
US 2021/0231104 A1    Jul. 29, 2021

(30) Foreign Application Priority Data
May 18, 2018    (FR) ...................................... 1854198

(51) Int. Cl.
*F03D 7/06*    (2006.01)
*F03D 9/25*    (2016.01)
(Continued)

(52) U.S. Cl.
CPC ............... *F03D 7/06* (2013.01); *F03D 3/005* (2013.01); *F03D 9/25* (2016.05); *F03D 15/00* (2016.05);
(Continued)

(58) Field of Classification Search
CPC ... F03D 7/06; F03D 9/25; F03D 15/00; F03D 3/005; H02K 7/1004; H02K 7/183; F05B 2240/30
(Continued)

(56) References Cited

U.S. PATENT DOCUMENTS 2,485,543 A * 10/1949 Andreau ................. F03D 15/05
60/398
4,364,710 A    12/1982 Campbell
(Continued)

FOREIGN PATENT DOCUMENTS

EP    0009226 A2 *  4/1980    ............... F03D 7/06
EP    0009226 A2     4/1980
(Continued)

OTHER PUBLICATIONS

French Search Report from French Patent Application No. 1854198, dated Jan. 29, 2019.
(Continued)

*Primary Examiner* — Charles Reid, Jr.
(74) *Attorney, Agent, or Firm* — Greer, Burns & Crain, Ltd

(57) ABSTRACT

A collapsible wind turbine includes a turbine with a vertical axis (A). The turbine is supported by a vertical pylon, pivotably mounted about a hinge, and by linking members connecting the rotation shaft of the turbine to the pylon while maintaining a separation therebetween. The wind turbine includes: —an electricity generator of which the axis of rotation is perpendicular to the longitudinal axis of the
(Continued)

pylon, the generator being secured to the ground; and—at least one flexible link connecting and synchronising the rotation of the generator with the rotation shaft of the turbine by linear travel of the flexible link in a closed-circuit path, so as to drive the rotation shaft of the generator by the movement of the turbine. The present structure is, in particular related to land-based wind turbines in a cyclone-prone area.

13 Claims, 3 Drawing Sheets

(51) Int. Cl.
    *F03D 15/00*    (2016.01)
    *F03D 3/00*     (2006.01)
    *H02K 7/10*     (2006.01)
    *H02K 7/18*     (2006.01)

(52) U.S. Cl.
    CPC ........... *H02K 7/1004* (2013.01); *H02K 7/183* (2013.01); *F05B 2240/30* (2013.01)

(58) Field of Classification Search
    USPC ...................................................... 290/44, 55
    See application file for complete search history.

(56) References Cited

U.S. PATENT DOCUMENTS

| | | | |
|---|---|---|---|
| 5,252,029 | A | 10/1993 | Barnes |
| 8,299,645 | B2* | 10/2012 | Muchow ................. F03D 13/10 |
| | | | 290/55 |
| 2009/0224551 | A1* | 9/2009 | Williams .................. F03D 5/06 |
| | | | 290/55 |
| 2009/0257874 | A1 | 10/2009 | Rice |
| 2012/0286519 | A1* | 11/2012 | Yoon ....................... F03D 80/82 |
| | | | 290/55 |
| 2014/0361540 | A1* | 12/2014 | Knight .................... F03D 80/88 |
| | | | 290/44 |

FOREIGN PATENT DOCUMENTS

| | | |
|---|---|---|
| FR | 2920206 A1 | 2/2009 |
| GB | 2499219 A | 8/2013 |
| WO | 2008/099129 A2 | 8/2008 |
| WO | 2018/049827 A1 | 3/2018 |

OTHER PUBLICATIONS

International Search Report and Written Opinion for International Patent Application No. PCT/EP2019/062372, dated Jul. 22, 2019.

* cited by examiner

COLLAPSIBLE VERTICAL-AXIS WIND TURBINE

BACKGROUND

The present invention relates to a collapsible wind turbine comprising a turbine with a vertical axis. The turbine is supported by a vertical pylon, mounted pivotably about a hinge, and by linking members connecting the rotation shaft of the turbine to the pylon and maintaining a separation therebetween.

The wind turbine comprises:
- an electric generator, the axis of rotation of which is perpendicular to the longitudinal axis of the pylon, the generator being secured to the ground, and
- at least one flexible link connecting and synchronizing the rotation of the rotation shaft of the generator and the rotation shaft of the turbine by linear travel of said flexible link in a closed-circuit path, so as to drive the rotation shaft of the generator by the movement of the turbine.

The field of the invention is in particular that of land-based wind turbines, and more particularly of wind turbines installed in isolated areas and/or areas at high risk of earthquakes and/or exposed to extreme winds, or even cyclones.

Electricity generation is a crucial issue at present. Technologies for generation from renewable energy sources have been developed on the one hand in order to diversify the sources for supplying energy and on the other hand in order to generate electrical energy ecologically. Thus, wind turbines have been developed and installed in particular on land where there are no or very few obstacles and there is an easily accessible electricity network.

In the field of wind turbines in general, two types of installation are known: wind turbines of the horizontal axis type (called HAWT for "horizontal-axis wind turbine") and wind turbines of the vertical axis type (called VAWT for "vertical-axis wind turbine").

Wind turbine installations in areas prone to cyclones have also been developed. These wind turbines generally have the additional feature of a mast that can be collapsed to the ground in order to protect them from projectiles and wind force, beyond a certain threshold.

Document FR2920206 is known, which describes a wind turbine of the horizontal axis type comprising a collapsible mast mounted pivotably about a hinge arranged in an intermediate position between the lower and upper ends of the mast, the lower part of the mast forming a counterweight. The wind turbine comprises an electric generator located close to the ground, a transmission chain, extending inside the mast, which can be used to transmit the movement of the rotor to the generator.

Document FR2912450 is also known, which describes a wind turbine of the horizontal axis type comprising a support mast hinged to the ground and supporting an impeller with a horizontal axis, a hoisting mast, a hoisting cable connecting the hoisting mast to the ground, and an operating device suitable for varying the length of the cable so as to selectively collapse and raise the support mast. The hoisting mast is hinged to the ground independently of the support mast, and is suitable for following the support mast and collapsing completely until horizontal once the support mast has collapsed.

These embodiments have the drawbacks of having heavy hoisting devices which are complex and expensive.

Document U.S. Pat. No. 5,252,029 is also known, which describes a wind turbine of the vertical axis type comprising a hollow rotor shaft mounted vertically on a support structure with two, three or four rotor blades in a troposkein configuration on the rotor shaft in order to turn the shaft in response to the wind energy and to drive a generator in order to generate electrical energy. The turbine comprises an erecting hinge and a hoisting mast which allows the turbine to be raised by cable with the aid of a simple winch mounted at or near ground level.

This embodiment has the drawbacks of having a complex and expensive mechanical link, because of the presence of several coaxial shafts and oversized rolling bearings at the base of the mast.

An aim of the invention is to overcome, in full or in part, the drawbacks of the prior art. An aim in particular is both to reduce the wind turbine manufacturing and/or installation costs and to improve the reliability of wind turbines intended for isolated areas and/or areas at high risk of earthquakes and/or exposed to extreme winds, or even cyclones. Another aim of the invention is to make it easier the maintenance of wind turbines.

SUMMARY

According to the invention, at least one of the abovementioned aims is achieved with a collapsible wind turbine comprising:
- a turbine with a vertical axis and cross flow, the turbine comprising blades moved by the wind,
- an electric generator, the generator shaft of which rotates about a generator axis, driven in rotation by the turbine,
- a structure for holding the turbine, which comprises at least one vertical pylon, with a longitudinal axis, and a pivot hinge, said pylon being connected to the ground by said hinge and being mounted pivotably about said hinge according to a folding axis, typically horizontal, between a substantially vertical working position and a collapsed position, which is for example substantially horizontal.

According to the invention, the wind turbine comprises:
- top and bottom link members, which rigidly hold the turbine by its axis of rotation and maintains a separation between it and the pylon, the axis of rotation of the turbine being parallel to the longitudinal axis of the pylon, and
- at least one flexible transmission link connecting and synchronizing the rotation of the rotation shaft of the generator and the rotation shaft of the turbine by linear travel of said at least one flexible link in a closed-circuit path, such that the movement of the turbine drives the generator by its rotation shaft.

The wind turbine according to the invention has the advantages of limiting the mass of the wind turbine at its top and of lowering the centre of gravity of the wind turbine, which has the result of reducing the mechanical stresses in the pylon and therefore of reducing the quantity of material needed to produce said pylon, because of the reduction of the weight compared with horizontal-axis wind turbines and wind turbines with a troposkein configuration. Among other things, the reduction of the weight in general, and at the top of the pylon in particular, has the effect of making it easier to erect or tilt the pylon and/or of using a simpler and/or less expensive hoisting device. The wind turbine according to the invention thus proposes an improved reliability and a reduced manufacturing and installation cost compared with the collapsible wind turbines of the prior art.

By cross-flow turbine is meant a turbine arranged and configured to receive a flow of air in a direction substantially perpendicular to the axis of rotation of the turbine. Here, the turbine used has a substantially vertical axis of rotation.

Typically, the turbine comprises several rigid blades, distributed around its vertical axis, which extend between the top linking member and the bottom linking member. Each blade has, for example, a vertical part at a distance from the axis and rigidly connected to the centre of rotation by its end.

According to an embodiment, the turbine comprises at least two blades. The blades extend in a vertical direction. Each blade extends at each of its two ends by an arm. The blades extend mainly in a longitudinal direction and the arms extend mainly in a transverse direction. The blades describe cylinders when rotating. The arms are connected to shaft elements by pivoting links forming the axis of rotation of the blade. According to a first example, the turbine comprises two blades. According to a second example, the turbine comprises three blades.

Preferably, the wind turbine comprises a single turbine. The turbine comprises two blades extending vertically which are arranged diametrically opposite with respect to the axis of rotation of the turbine, each blade comprising an upper arm and a lower arm extending to the axis of rotation from respectively a top end and a bottom end of said blade, each arm extending substantially horizontally.

Each linking member holds one end of an axis of rotation of a turbine. The top and bottom linking members extend from the pylon. The bottom linking member holds the lower end of the axis of rotation of the turbine. The top linking member holds the upper end of the axis of rotation of the turbine. The top and bottom linking members respectively comprise a rotation shaft element such that each shaft element has a pivot link with an axis with respect to a linking member.

For example, a linking member can be a rib or a spar. It extends substantially transversely and/or horizontally.

The linking members make it possible to hold each turbine by a pivot link. They make it possible to eliminate the need for a central drive shaft.

Preferably, in the case where the wind turbine comprises a single turbine, each top and bottom linking member comprises respectively a top shaft element and a bottom shaft element, which are coaxial with each other, and the turbine comprises a top hub and a bottom hub in such a way that the upper arms of the blades are secured to the top hub and the lower arms are secured to the bottom hub, the top and bottom hubs being mounted rotatably about the top shaft element and the bottom shaft element respectively.

Preferably, the electric generator is placed at the foot of the vertical pylon and is joined to the ground. This feature makes it possible not to have to raise the electric generator while the pylon is being erected. Moreover, the generator can be constantly protected from excessive winds or projectiles thrown by these excessive winds.

The generator axis extends in a direction which is parallel to a horizontal plane such as the ground, and/or perpendicular to the longitudinal axis of the pylon when the latter is in a vertical operating position. Preferably, the generator axis extends in a direction which is parallel to the folding axis of the hinge. This feature makes it possible not to have to take down the link of the rotation shaft of the generator because the latter pivots at the same time as the pylon.

According to a preferred embodiment, the axis of the generator is substantially coaxial with the folding axis of the hinge.

Preferably, the wind turbine comprises:
a rotor wheel, rotationally joined to the rotation shaft of the turbine,
a generator wheel, rotationally joined to the rotation shaft of the electric generator,
a deflection device of the path of the at least one flexible link, arranged between the rotation shaft of the turbine and the rotation shaft of the generator.

The rotor wheel, the generator wheel and the deflection device are arranged in order to receive the at least one flexible link and to couple the rotation of the generator to the rotation of the rotor. The deflection device forms, for the at least one flexible link, a deflection which is arranged on the path of the flexible link.

The deflection device makes it possible for the at least one flexible link to follow a path along a horizontal plane of the rotor wheel and a substantially vertical plane which descends towards the bottom of the pylon. The deflection device makes it possible for the at least one flexible link to follow a path along the pylon and along one of the linking members.

Preferably, the rotor wheel is arranged on a bottom linking member, which makes it possible to reduce the length of the closed-circuit path of the at least one flexible link.

According to an embodiment, the deflection device comprises two idler wheels, which are coaxial with each other and rotatable about a deflection axis of rotation which is perpendicular both to the axis of rotation of the turbine and to the generator axis.

Preferably, the at least one flexible link is arranged on the outside, at least, of the pylon. This feature makes it possible to make the manufacture, installation and maintenance of the wind turbine easier.

For example, the at least one flexible link can be produced in the form of a timing belt, cable or chain.

In the preceding and in the remainder of the specification, by "wheel" is meant any wheel or pulley arranged and configured to receive a belt or a cable, or any toothed wheel arranged and configured to receive a chain and able to cooperate by adherence and/or engagement therewith.

According to an embodiment of the wind turbine, the diameter of the rotor wheel is at least twice as large as that of the generator wheel. The rotor wheel has a circumferential surface and therefore a surface of contact with the at least one flexible link making it possible to ensure the transmission of the torque by adherence and/or engagement between the turbine, via the rotor wheel, and the at least one flexible link.

Preferably, the wind turbine comprises a braking device, comprising:
a brake actuator,
a brake disc rotationally linked to the rotor wheel, and
at least one brake lining arranged between the brake actuator and the brake disc.

The brake actuator is arranged and configured to act, during braking, by friction on the brake disc via the at least one brake lining.

Whatever the embodiment, the turbine is located at least three metres and/or at least one or even two times the height of the turbine away from the ground.

According to an embodiment, the wind turbine comprises a hoisting device. Preferably, the hoisting device comprises a winch, at least one cable connected both to the winch and to the top of the pylon, and a hoisting arm secured to the pylon in a perpendicular position. For example, the hoisting arm is secured to the base of the pylon.

Optionally, the turbine comprises a pull line connecting the two blades to each other and extends substantially horizontally to approximately halfway up the turbine. This feature makes it possible to hold the blades.

Optionally, the wind turbine comprises at least one photovoltaic panel secured to the pylon.

Again optionally, the wind turbine comprises a control unit arranged and configured to remote-control, in an automated manner, the electric generator and/or the winch of the hoisting device and/or the brake actuator of the braking device.

BRIEF DESCRIPTION OF THE DRAWINGS

Other features and advantages of the invention will become apparent on reading the detailed description of embodiments and implementations which are in no way limitative, in the light of the attached figures, in which.

DETAILED DESCRIPTION

The embodiments which will be described in the following are in no way limitative; in particular, variants of the invention will be able to be implemented which comprise only a selection of features described hereinafter in isolation from the other features described if this selection of features is sufficient to confer a technical advantage or to differentiate the invention with respect to the state of the prior art. This selection comprises at least one, preferably functional, feature without structural details, or with only a part of the structural details if this part alone is sufficient to confer a technical advantage or to differentiate the invention with respect to the state of the prior art.

In particular, all the variants and all the embodiments described can be combined together if there is no objection to this combination from a technical point of view.

Figures 1, 2:
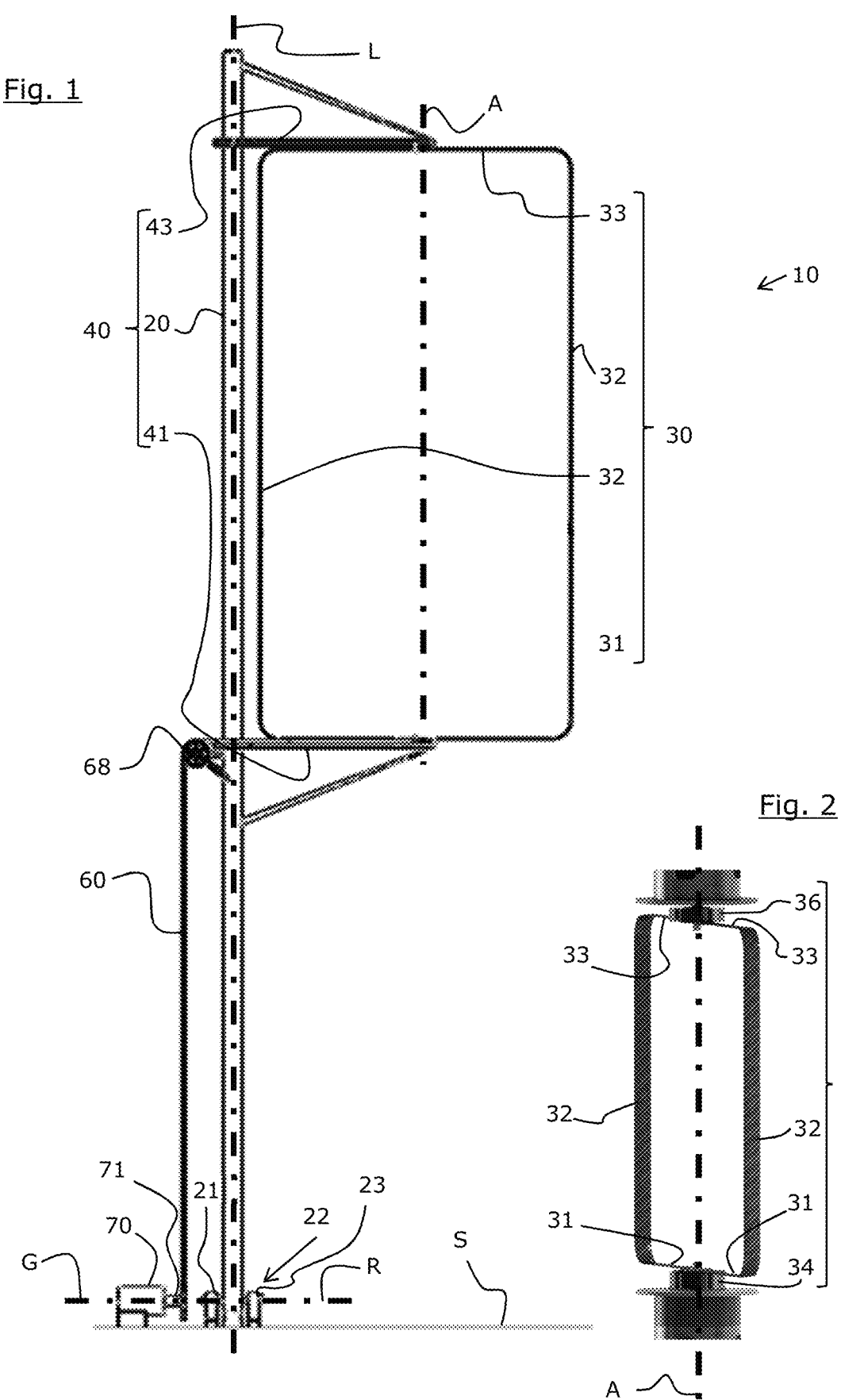
FIG. 1 is a front view of a collapsible wind turbine according to an embodiment of the invention in which the wind turbine is secured to the ground and shown in a vertical operating state and comprises a turbine with two blades, the turbine also being viewed from the front and located approximately one times the height of the turbine away from the ground.
FIG. 2 is a photo showing an example of a turbine with two blades as used in this embodiment.
Figure 3:
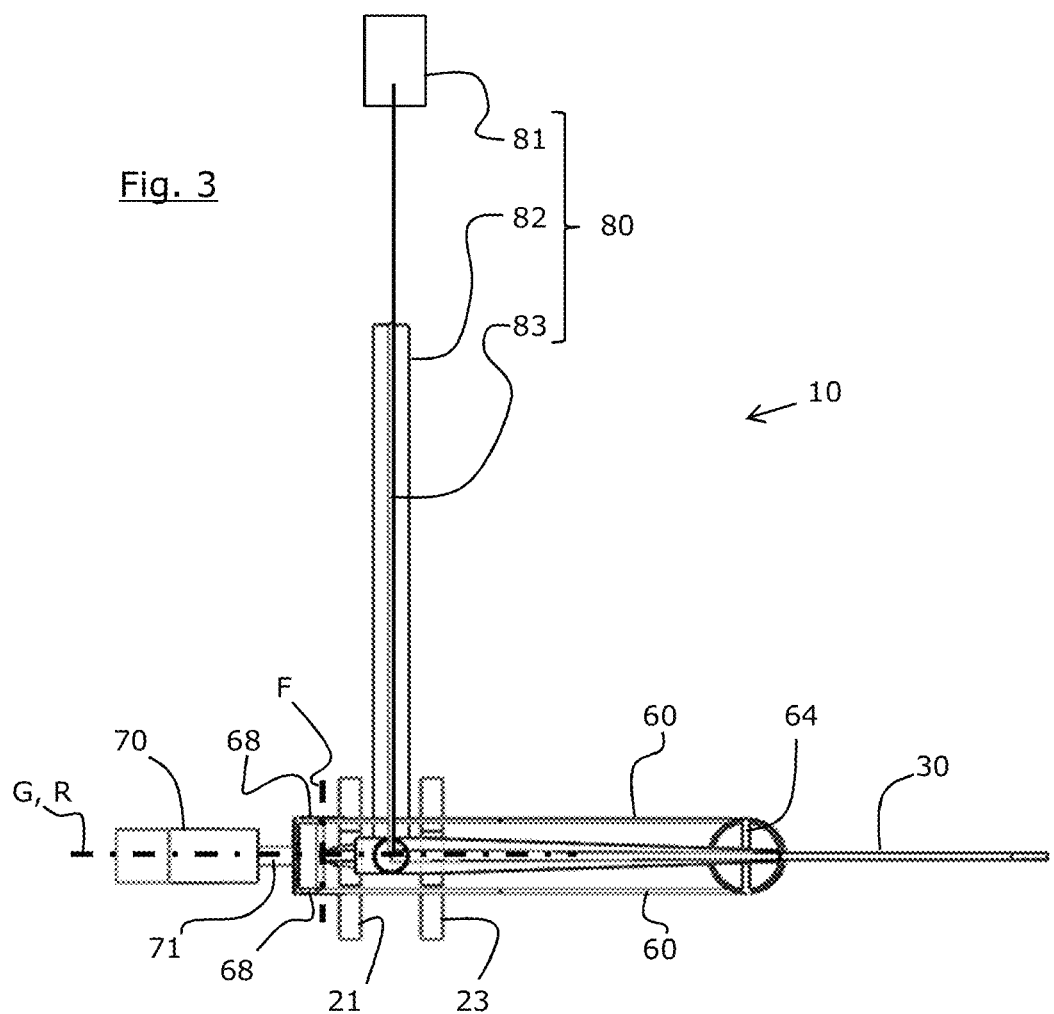
FIG. 3 is a view from above of the wind turbine according to FIG. 1.
Figure 4:
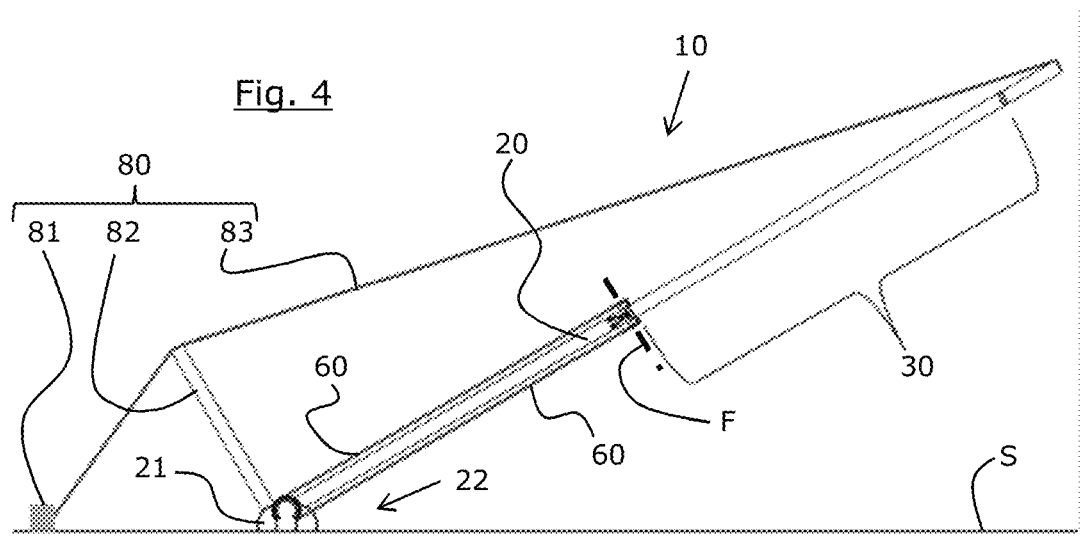
FIG. 4 is a view from the left, and in an inclined state with respect to the ground, of the wind turbine according to FIGS. 1 and 3.

FIGS. 1, 3 and 4 illustrate a collapsible wind turbine 10 of the vertical axis type (called VAWT for "vertical-axis wind turbine") and with cross flow. The wind turbine is arranged and configured to collapse from a first, vertical position, called the operating position, to a second, horizontal position, called the protection position. The collapsible wind turbine is intended to be installed in isolated areas and/or areas at high risk of earthquakes and/or exposed to extreme winds, or even cyclones. In case of risk, it is thus possible to collapse the wind turbine to the ground in order to protect it, for example from projectiles propelled by the wind. It also becomes easier to dismantle it if necessary.

Tie rods, cables or guy wires (not shown) are used to hold the wind turbine in position with respect to the ground and to prevent it from swaying.

With reference to FIGS. 1 and 2, the wind turbine 10 comprises a turbine 30 having a vertical axis of rotation A. The turbine 30 comprises two blades 32. The turbine 30 comprises two blades 32 which extend vertically and, during operation, are subjected to the action of the wind in order to make the turbine rotate. The blades 32 extend parallel to the axis of rotation A of the turbine and are arranged diametrically opposite with respect to said axis of rotation A.

Each blade 32 extends at each of its two ends, a top end and a bottom end, by a horizontal arm. At the top end, each blade 32 extends by an upper arm 33. At the bottom end, each blade 32 extends by a lower arm 31. The upper 33 and lower 31 arms are connected respectively to the blade 32 by a curved bend. The blades of each turbine describe a cylinder when they rotate. The arms are connected to shaft elements by pivot links forming the axis of rotation of the blade, see FIGS. 5 and 6 for the shaft element 45 of the bottom linking member. For example, all of the lower arms or all of the upper arms of the turbine are connected to a hub which is itself rotatable relatively about a shaft element forming the axis of rotation of the blade, the shaft element being rigidly secured to a linking member, see below. In this configuration, the central space between the blades does not comprise a rotation shaft and is completely empty.

With reference to FIG. 2, the turbine 30 comprises two turbine axis hubs, a top hub 36 and a bottom hub 34. The hubs 36 and 34 are rotatable about shaft elements with a reduced height of axis A. Each upper arm 33 is secured to a top hub 36 (see FIG. 2) and each lower arm 31 is secured to a bottom hub 34 (see FIGS. 2 and 5). The bottom hub 34 is rotatable about the bottom shaft element 45, see FIG. 5.

Preferably, the hubs are produced from a metallic material and the blades are produced from a composite material, for example based on carbon fibres.

The wind turbine 10 comprises a holding structure 40 for the turbine 30. Said structure comprises a pylon 20 extending along a longitudinal axis L. The axis L of the pylon 20 is substantially parallel to the axis of rotation A of the turbine. During operation, the pylon 20 is located in a vertical position, see FIGS. 1 and 5.

The holding structure for the wind turbine 10 comprises linking members, a top linking member 43 and a bottom linking member 41, securely connected to the pylon 20 which supports the rotation shafts of the turbines and maintains a separation between them and the pylon. With reference to FIG. 1, the wind turbine 10 comprises a top linking member 43 and a bottom linking member 41 for supporting the turbine 30. The top linking member 43 extends substantially from the top of the pylon; the bottom linking member 41 extends from the pylon, in this example at approximately halfway along it. The bottom linking member is preferably located at least three metres away from the ground S. The top 43 and bottom 41 linking members thus hold the turbine at its ends by a pivot link, eliminating the need for a central drive shaft between the blades.

Figure 7:
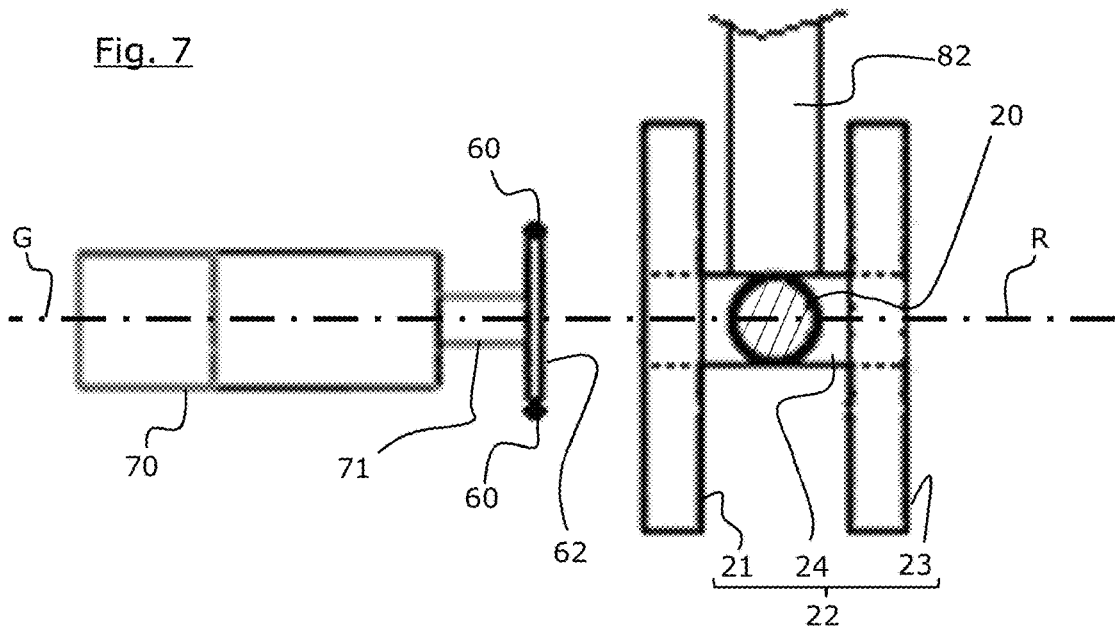
FIG. 7 is a view from above of the base of the pylon and of an electric generator secured to the ground, the pylon being viewed in cross section.

With reference to FIGS. 1 and 4, the holding structure for the wind turbine 10 comprises a pivot hinge 22 of the pylon 20 relative to the ground S, in such a way that the pylon 20 is connected to the ground S by said hinge. The hinge 22 produces a pivot link with a horizontal axis, called the folding axis R. The folding axis R is perpendicular to the longitudinal axis L of the pylon 20, see FIG. 1. According to an embodiment, the holding structure comprises a set of feet 21, 23 secured to the ground, see FIGS. 3 and 7. With reference to FIG. 7, each foot 21, 23 comprises a bore provided to produce the female part of the pivot hinge 22. The feet 21 and 23 are arranged with respect to each other in such a way that the bores are coaxial with each other in order to receive a pivot shaft. Moreover, the holding structure comprises a pivot shaft 24, referenced only in FIG. 7. The latter is connected securely to the base of the pylon such that it extends in a direction perpendicular to the longitudinal axis L of the pylon. The pivot shaft 24 is mounted in the bores of the feet 21 and 23 in order to produce the pivot hinge 22. The pivot hinge 22 makes it possible to pivot the wind turbine between a substantially vertical operating position and a substantially horizontal collapsed position. FIG. 4 shows an inclined intermediate state between said positions.

With reference to FIGS. 3 and 4, the wind turbine comprises a hoisting device 80 in order to actuate the pivoting thereof.

The hoisting device comprises a winch 81 secured to the ground and a cable 83 connecting the top of the pylon and the winch 81, see FIG. 4. The hoisting device moreover comprises a hoisting arm 82 rigidly secured perpendicularly to the pylon 20. With reference to FIG. 7, the hoisting arm 82 is secured to the pivot shaft 24 of the pylon 20. With reference to FIG. 4, the hoisting arm 82 is secured to the base of the pylon, so as to create a lever arm, moving the traction point of the cable 83 away from the pylon 20, thus making it easier to lift the wind turbine. The cable 83 must lean on the distal end of the hoisting arm 82. The winch 81 is arranged at a distance from the base of the pylon and in such a way that the cable 83 leans on the hoisting arm 82, which holds it away from the hinge 22, see FIG. 4.

The wind turbine comprises an electric generator 70 in order to convert the mechanical energy from rotation of the turbine into electrical energy. With reference to FIGS. 1, 3 and 7, the electric generator 70 comprises a rotation shaft 71 rotatable about the generator axis G. The shaft of the generator is driven in rotation by the rotation of the turbine. With reference to FIG. 1, the generator is located at the base of the pylon 20 and is secured to the ground S. According to a preferred embodiment, the generator axis G is substantially coaxial with the folding axis R of the hinge. This feature makes it possible not to lay down (or loosen) the mechanical transmission means between the generator and the turbine, because they are pivotable about the same axis. Advantageously, the generator can be arranged totally independently with respect to the pylon without interfering with the erecting or lowering movements thereof. Preferably, the generator is a variable speed permanent magnet generator.

The wind turbine moreover comprises a flexible link 60 as mechanical transmission means between the turbine and the generator, see FIGS. 1, 3, 5 and 7. The flexible link, for example a belt or chain, is arranged and configured in order to connect and synchronize the rotation of the rotation shaft of the generator and the rotation shaft of the turbine by a linear travel in a closed-circuit path.

Figure 5:
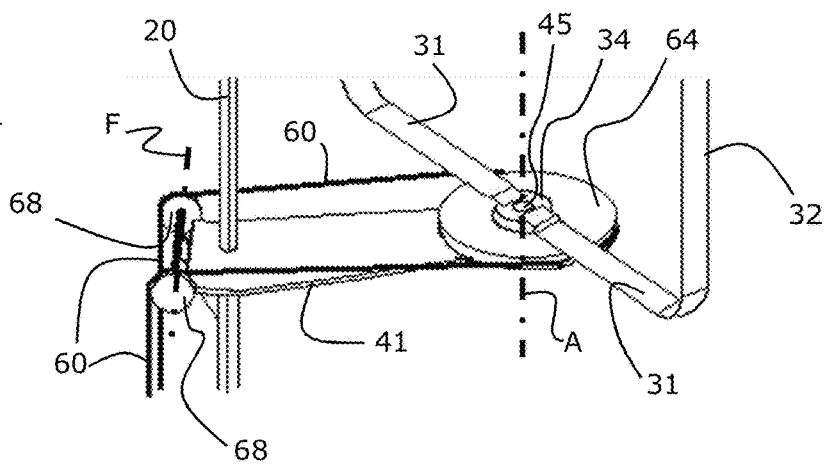
FIG. 5 is a perspective view of a bottom linking member and showing the flexible link connecting the rotor pulley to the deflection device secured to the pylon.

With reference to FIG. 5, the wind turbine comprises a rotor pulley 64 arranged coaxially with the bottom hub 34 of the turbine. With reference to FIG. 7, the wind turbine comprises a generator pulley 62 arranged coaxially with the rotation shaft 71 of the generator. With reference to FIG. 5, the wind turbine comprises idler wheels 68 arranged coaxially with each other and mounted freely rotatable with respect to the holding structure. The rotor pulley 64, the generator pulley 62 and the idler wheels 68 are arranged to receive, on their circumferential surface, the flexible link and to cooperate therewith by adherence. The idler wheels 68 make it possible to produce a deflection device of the path between the bottom hub of the rotor and the pulley 62 of the generator such that the path of the flexible link runs along the bottom linking member (see FIG. 5) and the part of the pylon between the bottom linking member and the base of the pylon (see FIGS. 1 and 4).

The idler wheels 68 are arranged vertically and mounted pivotably linked about the horizontal axis, called pivot axis F, with respect to the bottom linking member and the pylon. The pivot axis F is perpendicular both to the axis of rotation A of the turbine and to the generator axis G. The fixed part of the pivot link is secured to the pylon 20 and/or to the linking member 41. Preferably, the fixed part of the pivot link is secured to the pylon. The idler wheels 68 are arranged relative to the pylon at a height such that the axis F of rotation of the idler wheels is arranged at the same height as the bottom linking member. Moreover, the idler wheels 68 are arranged such that the geometric plane, containing the rotor pulley, draws a tangent to the circumference of the idler wheels. This feature makes it possible for the at least one flexible link to extend substantially horizontally between the rotor pulley and the idler wheels, and makes it possible to shift the flexible link outside the rotor pulley or idler wheels. Similarly, the plane of the generator pulley 62 draws a tangent to the idler wheels 68. Preferably, the axial spacing of the idler wheels is less than or equal to the diameter of the rotor pulley 64.

Owing to the arrangement of the vertical-axis turbine on the wind turbine, the securing of the generator to the ground and the use of a flexible link, the mass of the wind turbine, in particular at the top thereof, is reduced, which has the result of reducing the mechanical stresses in the pylon and therefore of reducing the quantity of material needed to produce said pylon, because of the reduction of the weight compared with the wind turbines of the prior art. Thus, it becomes easier to collapse and/or erect the wind turbine and/or more quickly collapse the wind turbine, for example over a period shorter than 45 minutes. For example, the time it takes to wind up the flexible link can be of the order of 5 minutes during the procedure of erecting or collapsing the wind turbine. Moreover, the strains on the hoisting device are reduced. It becomes possible to use a hoisting winch called standard or of reduced pulling power, which is therefore less expensive.

The wind turbine has the advantage of largely dispensing with expensive and delicate components, namely:
  the variable-pitch system (in fact, the present wind turbine has a fixed pitch and therefore operates at variable speed in line with a variable-speed permanent magnet generator),
  the system for orienting the nacelle into the wind (in fact, a wind turbine of the single-rotor vertical-axis type can operate whatever the direction of the wind),
  the multiplier (in fact, the transmission by cable will make it possible to ensure this function for driving a variable-speed permanent magnet generator),
  the swivel connector which ensures, on wind turbines of the horizontal-axis type, the electrical connection between the nacelle (mobile) and the mast (fixed).

Figure 6:
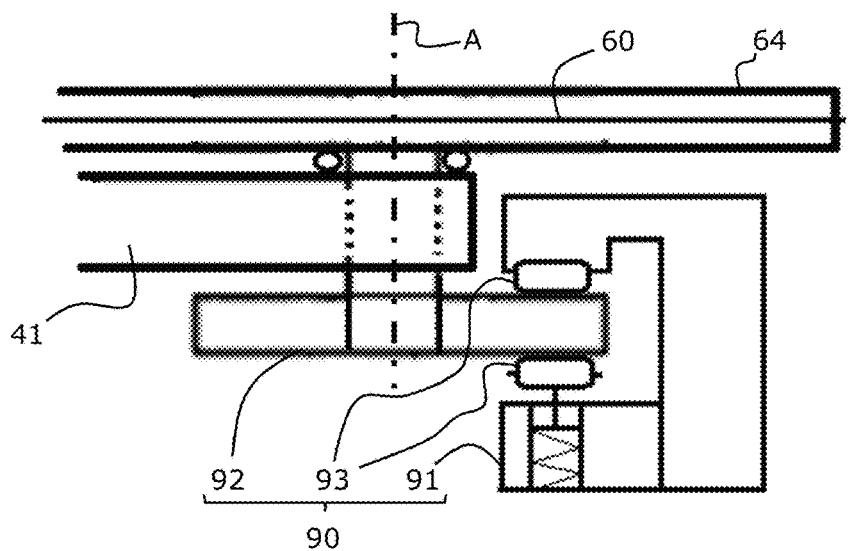
FIG. 6 is a diagrammatic front view of a bottom linking member supporting the rotor pulley, which is connected to a braking device of said pulley.

With reference to FIG. 6, the wind turbine comprises a braking device 90 of the turbine. In the case of emergency, the braking device makes it possible to slow down, until completely stopped, the rotation of the rotor pulley so as to collapse the wind turbine more quickly.

The braking device comprises:
a braking actuator 91, connected (not shown) to the bottom linking member 41,
a brake disc 92 rotationally linked to the rotor pulley 64, and
two brake linings 93 arranged respectively between the brake actuator 91 and the brake disc 92.

With reference to FIG. 6, the rotation shaft element 45 of the turbine crosses the thickness of the bottom linking member 41 and emerges from a lower side, facing the ground, opposite the upper side on which the rotor pulley 64 is arranged. The brake disc 92 is secured to the rotation shaft element 45 under the bottom linking member 41.

The brake actuator 91 is arranged and configured to act, during braking, by adherence on the brake disc 92 via the brake linings 93.

The invention claimed is:

1. A collapsible wind turbine, comprising:
   a. a turbine with a vertical axis (A) and cross flow, the turbine comprising blades moved by the wind;
   b. an electric generator including a rotation shaft, the rotation shaft being rotatable about a generator axis (G) and driven by the turbine;
   c. a holding structure for the turbine, which comprises at least one vertical pylon, with a longitudinal axis (L), and a pivot hinge (22), said pylon being connected to the ground by said hinge and being mounted pivotably about said hinge according to a folding axis (R) between a substantially vertical working position and a collapsed position;
   d. top and bottom linking members, which rigidly hold the turbine about an axis of rotation (A) and maintain a separation between the axis of rotation and the pylon, the axis of rotation (A) of the turbine being parallel to the longitudinal axis (L) of the pylon; and
   e. at least one flexible transmission link connecting and synchronizing the rotation of the rotation shaft of the generator and the rotation shaft of the turbine by linear travel of said at least one flexible link in a closed-circuit path, such that the movement of the turbine drives the generator by the rotation shaft,
   wherein the at least one flexible transmission link is parallel to and mounted to the pylon and thereby pivots between the substantially vertical position and the collapsed position.

2. The turbine according to claim 1, wherein the electric generator is placed at the base of the vertical pylon and joined to the ground.

3. The wind turbine according to claim 2, wherein the generator axis (G) is substantially coaxial with the folding axis (R) of the hinge.

4. The wind turbine according to claim 1, further comprising:
   a. a rotor wheel, rotationally joined to a rotation shaft of the turbine;
   b. a generator wheel, rotationally joined to the rotation shaft of the electric generator;
   c. a deflection device for the path of the at least one flexible link, arranged between the rotation shaft of the turbine and the rotation shaft of the generator; and
   the rotor wheel, the generator wheel and the deflection device being arranged to receive the at least one flexible link and couple the rotation of the generator to the rotation of the rotor, and the deflection device forming, for the at least one flexible link, a deflection which is arranged on the path of the at least one flexible link.

5. The wind turbine according to claim 4, wherein the deflection device comprises two idler wheels, coaxial with each other and rotatable about a deflection axis of rotation (F) which is perpendicular both to the axis of rotation (A) of the turbine and to the generator axis (G).

6. The wind turbine according to claim 4, wherein the diameter of the rotor wheel is at least twice as large as that of the generator wheel.

7. The wind turbine according to claim 4, further comprising a braking device comprising:
   a. a brake actuator;
   b. a brake disc rotationally linked to the rotor wheel; and
   c. at least one brake lining arranged between the brake actuator and the brake disc;
   the brake actuator being arranged and configured to act, during braking, by friction on the brake disc via the at least one brake lining.

8. The wind turbine according to claim 1, wherein the at least one flexible link is arranged on the outside, at least, of the pylon.

9. The wind turbine according to claim 1, wherein the at least one flexible transmission link is produced in the form of a timing belt, cable or chain.

10. The wind turbine according to claim 1, wherein the turbine is located at least three meters or at least one times the height of the turbine away from the ground.

11. The wind turbine according to claim 1, wherein the turbine comprises two blades extending vertically which are arranged diametrically opposite with respect to the axis of rotation (A) of the turbine, each blade comprising an upper arm and a lower arm extending to the axis of rotation respectively from a top end and a bottom end of said blade, each arm extending substantially horizontally.

12. The wind turbine according to claim 11, wherein each top and bottom linking member each include a shaft element, which are coaxial with each other, and in that the turbine comprises a top hub and a bottom hub in such a way that the upper arms of the blades are secured to the top hub and the lower arms are secured to the bottom hub, the top and bottom hubs being mounted rotatably respectively about the shaft elements of the top and bottom linking member.

13. The wind turbine according to claim 1, further comprising a hoisting device comprising a winch, at least one cable connected both to the winch and to the top of the pylon, and a hoisting arm secured to the pylon in a perpendicular position.

* * * * *